(12) United States Patent
Volmerding

(10) Patent No.: US 11,230,954 B2
(45) Date of Patent: Jan. 25, 2022

(54) DEPOSIT REDUCTION USING INTERIOR SURFACE FINISHING

(71) Applicant: Cummins Emission Solutions Inc., Columbus, IN (US)

(72) Inventor: Matthew K. Volmerding, Columbus, IN (US)

(73) Assignee: Cummins Emission Solutions Inc., Columbus, IN (US)

( * ) Notice: Subject to any disclaimer, the term of this patent is extended or adjusted under 35 U.S.C. 154(b) by 0 days.

(21) Appl. No.: 16/629,280

(22) PCT Filed: Jul. 17, 2018

(86) PCT No.: PCT/US2018/042478
§ 371 (c)(1),
(2) Date: Jan. 7, 2020

(87) PCT Pub. No.: WO2019/018388
PCT Pub. Date: Jan. 24, 2019

(65) Prior Publication Data
US 2020/0157996 A1  May 21, 2020

Related U.S. Application Data

(60) Provisional application No. 62/534,294, filed on Jul. 19, 2017.

(51) Int. Cl.
*F01N 3/20* (2006.01)
*F01N 9/00* (2006.01)
*B01D 53/94* (2006.01)
*F01N 3/035* (2006.01)
*F01N 13/16* (2010.01)

(52) U.S. Cl.
CPC ........... *F01N 3/2066* (2013.01); *F01N 9/00* (2013.01); *B01D 53/9495* (2013.01); *B01D 2251/2067* (2013.01); *F01N 3/035* (2013.01); *F01N 13/16* (2013.01); *F01N 2530/04* (2013.01); *F01N 2610/02* (2013.01); *F01N 2610/1453* (2013.01)

(58) Field of Classification Search
CPC combination set(s) only.
See application file for complete search history.

(56) References Cited

U.S. PATENT DOCUMENTS 3,819,343 A   6/1974  Rhoades
7,963,104 B2  6/2011  Girard et al.
9,157,358 B2* 10/2015 Beckmann .............. F01N 3/28
(Continued)

FOREIGN PATENT DOCUMENTS

WO  WO-2010/088208 A2  8/2010
WO  WO-2014/051598 A1  4/2014

OTHER PUBLICATIONS

International Search Report from PCT Application No. PCT/US2018/042478, dated Oct. 2, 2018, pp. 1-2.
(Continued)

*Primary Examiner* — Binh Q Tran
(74) *Attorney, Agent, or Firm* — Foley & Lardner LLP

(57) ABSTRACT

An aftertreatment component includes an aftertreatment housing. The aftertreatment housing has a first surface positioned so as to be directly impinged by diesel exhaust fluid injected into the aftertreatment housing. The first surface is a polished surface.

20 Claims, 5 Drawing Sheets

(56) References Cited

U.S. PATENT DOCUMENTS

| | | | |
|---|---|---|---|
| 10,060,320 B2* | 8/2018 | Blomgren | F01N 3/2066 |
| 10,077,702 B2* | 9/2018 | Floyd | B01D 53/9431 |
| 2003/0070424 A1 | 4/2003 | Verdegan et al. | |
| 2007/0036694 A1* | 2/2007 | Nishioka | B01D 53/90 |
| | | | 422/168 |
| 2007/0163241 A1* | 7/2007 | Meingast | F01N 3/2892 |
| | | | 60/286 |
| 2008/0296354 A1 | 12/2008 | Crockett et al. | |
| 2011/0271662 A1 | 11/2011 | Winsor | |
| 2013/0121886 A1* | 5/2013 | Nakano | F01N 3/36 |
| | | | 422/173 |
| 2014/0007559 A1 | 1/2014 | Janssen et al. | |
| 2015/0361849 A1 | 12/2015 | Chiruta et al. | |
| 2016/0160735 A1 | 6/2016 | Kapale et al. | |

OTHER PUBLICATIONS

Written Opinion from PCT Application No. PCT/US2018/042478, dated Oct. 2, 2018, pp. 1-6.

\* cited by examiner

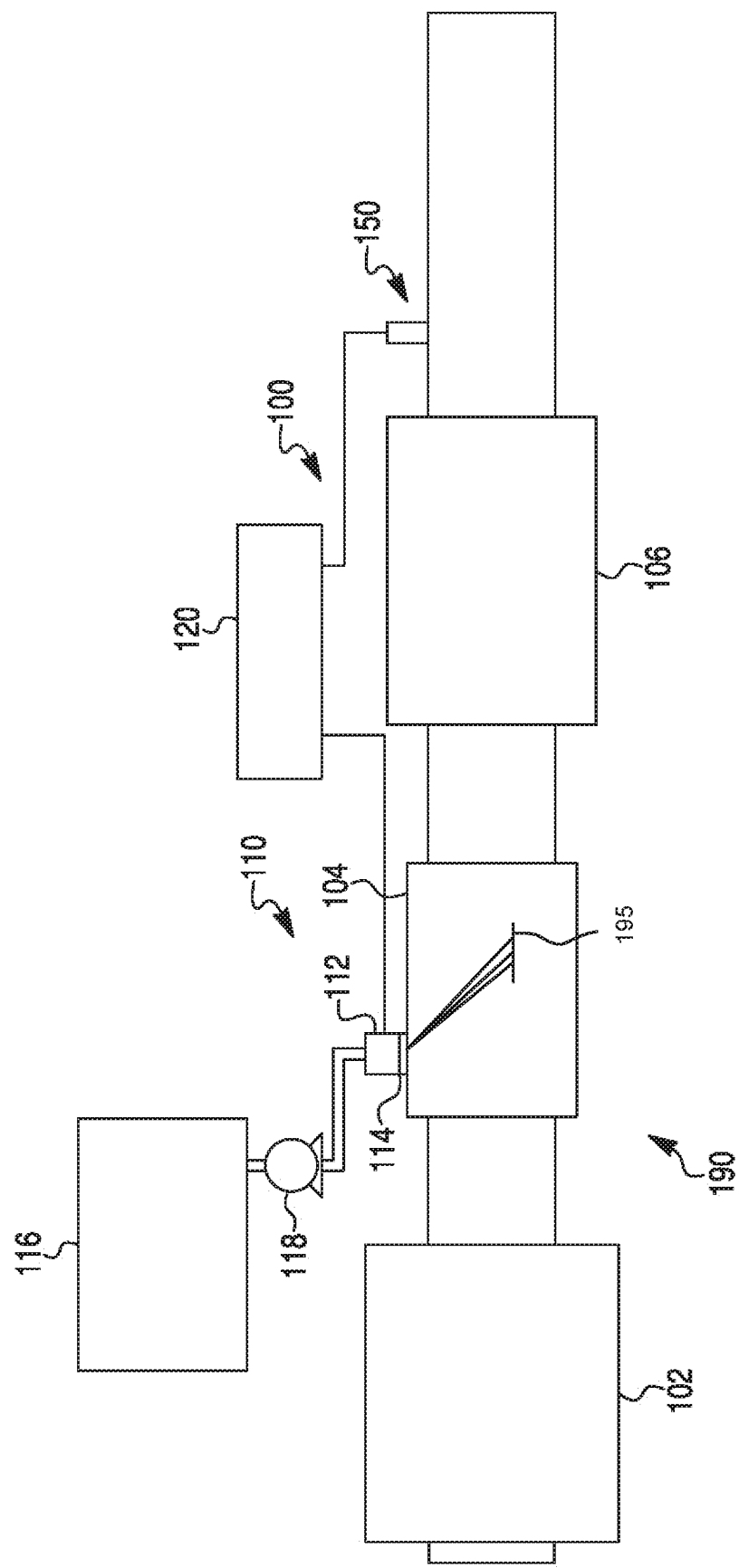

Standard Plate

Polished Plate

DEPOSIT REDUCTION USING INTERIOR SURFACE FINISHING

CROSS-REFERENCE TO RELATED PATENT APPLICATIONS

This application is a U.S. national stage of PCT Application No. PCT/US2018/042478, filed Jul. 17, 2018, which claims the benefit of priority from U.S. Provisional Application Ser. No. 62/534,294, filed Jul. 19, 2017, the contents of which are incorporated herein by reference in their entireties.

TECHNICAL FIELD

The present application relates generally to the field of aftertreatment systems for internal combustion engines.

BACKGROUND

For internal combustion engines, such as diesel engines, nitrogen oxide ("$NO_x$") compounds may be emitted in the exhaust. To reduce $NO_x$ emissions, a selective catalytic reduction ("SCR") process may be implemented to convert the $NO_x$ compounds into more neutral compounds, such as diatomic nitrogen, water, or carbon dioxide, with the aid of a catalyst and a reductant. The catalyst may be included in a catalyst chamber of an exhaust system, such as that of a vehicle or power generation unit. A reductant, such as anhydrous ammonia, aqueous ammonia, or urea, is typically introduced into the exhaust gas flow prior to the catalyst chamber. One commonly used urea source is diesel exhaust fluid ("DEF"), which decomposes and hydrolyzes in a two-step reaction to form ammonia. To introduce the reductant into the exhaust gas flow for the SCR process, an SCR system may dose or otherwise introduce the reductant through a dosing module that vaporizes or sprays the reductant into an exhaust pipe of the exhaust system up-stream of the catalyst chamber. The SCR system may include one or more sensors to monitor conditions within the exhaust system.

SUMMARY

Implementations described herein relate to an aftertreatment component including an aftertreatment housing. The aftertreatment housing has a first surface positioned so as to be directly impinged by diesel exhaust fluid injected into the aftertreatment housing. The first surface is a polished surface.

Another implementation relates to a method for processing an aftertreatment component. A first surface of a splash plate is polished using an extrude honing process. The splash plate is positioned in the housing such that the first surface of the splash plate is to be directly impinged by diesel exhaust fluid injected into the housing.

BRIEF DESCRIPTION

The details of one or more implementations are set forth in the accompanying drawings and the description below. Other features, aspects, and advantages of the disclosure will become apparent from the description, the drawings, and the claims, in which:

FIG. 1 is a block schematic diagram of an example selective catalytic reduction system having an example reductant delivery system for an exhaust system;

Figure 2A:
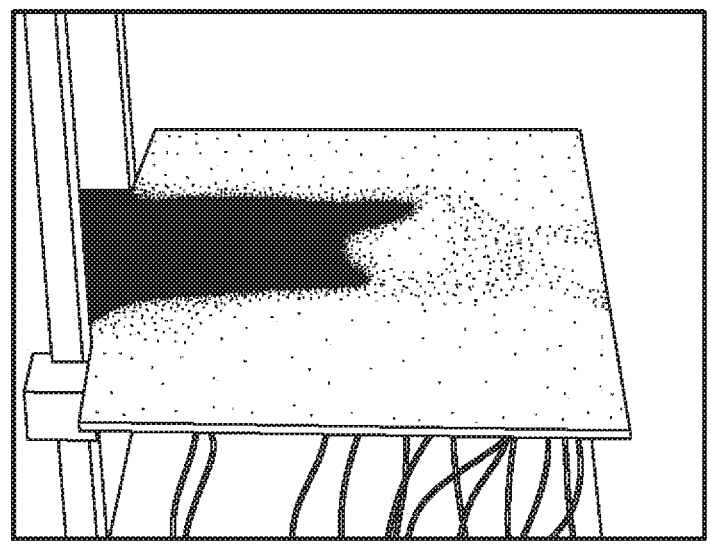
FIGS. 2A and 2B show visual distinctions between a standard, unpolished plate (FIG. 2A) and a polished plate (FIG. 2B)

It will be recognized that some or all of the figures are schematic representations for purposes of illustration. The figures are provided for the purpose of illustrating one or more implementations with the explicit understanding that they will not be used to limit the scope or the meaning of the claims.

DETAILED DESCRIPTION

Following below are more detailed descriptions of various concepts related to, and implementations of, methods, apparatuses, and systems for aftertreatment of internal combustion engines. The various concepts introduced above and discussed in greater detail below may be implemented in any of numerous ways, as the described concepts are not limited to any particular manner of implementation. Examples of specific implementations and applications are provided primarily for illustrative purposes.

Overview of Aftertreatment System

FIG. 1 depicts an aftertreatment system 100 having an example reductant delivery system 110 for an exhaust system 190. The aftertreatment system 100 includes a particulate filter, for example a diesel particulate filter ("DPF") 102, the reductant delivery system 110, a decomposition chamber (e.g., a reactor pipe) 104, a SCR catalyst 106, and a sensor 150.

The DPF 102 is configured to remove particulate matter, such as soot, from exhaust gas flowing in the exhaust system 190. The DPF 102 includes an inlet where the exhaust gas is received and an outlet where the exhaust gas exits after having particulate matter substantially filtered from the exhaust gas and/or converting the particulate matter into carbon dioxide.

The decomposition chamber 104 is configured to convert a reductant, such as urea, aqueous ammonia, or DEF, into ammonia. The decomposition chamber 104 includes a reductant delivery system 110 having a dosing module 112 configured to dose the reductant into the decomposition chamber 104. In some implementations, the reductant is injected upstream of the SCR catalyst 106. The reductant droplets then undergo the processes of evaporation, thermolysis, and hydrolysis to form gaseous ammonia within the exhaust system 190. The decomposition chamber 104 includes an inlet in fluid communication with the DPF 102 to receive the exhaust gas containing $NO_x$ emissions and an outlet for the exhaust gas, $NO_x$ emissions, ammonia, and/or remaining reductant to flow to the SCR catalyst 106.

The decomposition chamber 104 includes the dosing module 112 mounted to the decomposition chamber 104 such that the dosing module 112 may dose the reductant into the exhaust gases flowing in the exhaust system 190. The dosing module 112 may include an insulator 114 interposed between a portion of the dosing module 112 and the portion of the decomposition chamber 104 to which the dosing module 112 is mounted. The dosing module 112 is fluidly coupled to one or more reductant sources 116. In some implementations, a pump 118 may be used to pressurize the reductant from the reductant source 116 for delivery to the dosing module 112. The decomposition chamber 104 also includes a splash plate positioned therein. The splash plate is positioned so as to be directly impinged by DEF injected into the decomposition chamber 104.

The dosing module 112 and pump 118 are also electrically or communicatively coupled to a controller 120. The controller 120 is configured to control the dosing module 112 to dose reductant into the decomposition chamber 104. The controller 120 may also be configured to control the pump 118. The controller 120 may include a microprocessor, an application-specific integrated circuit ("ASIC"), a field-programmable gate array ("FPGA"), etc., or combinations thereof. The controller 120 may include memory, which may include, but is not limited to, electronic, optical, magnetic, or any other storage or transmission device capable of providing a processor, ASIC, FPGA, etc. with program instructions. The memory may include a memory chip, Electrically Erasable Programmable Read-Only Memory ("EEPROM"), erasable programmable read only memory ("EPROM"), flash memory, or any other suitable memory from which the controller 120 can read instructions. The instructions may include code from any suitable programming language.

The SCR catalyst 106 is configured to assist in the reduction of $NO_x$ emissions by accelerating a $NO_x$ reduction process between the ammonia and the $NO_x$ of the exhaust gas into diatomic nitrogen, water, and/or carbon dioxide. The SCR catalyst 106 includes inlet in fluid communication with the decomposition chamber 104 from which exhaust gas and reductant is received and an outlet in fluid communication with an end of the exhaust system 190.

The exhaust system 190 may further include an oxidation catalyst, for example a diesel oxidation catalyst ("DOC") in fluid communication with the exhaust system 190 (e.g., downstream of the SCR catalyst 106 or upstream of the DPF 102) to oxidize hydrocarbons and carbon monoxide in the exhaust gas.

In some implementations, the DPF 102 may be positioned downstream of the decomposition chamber or reactor pipe 104. For instance, the DPF 102 and the SCR catalyst 106 may be combined into a single unit, such as a DPF with SCR-coating ("SCR on filter"). In some implementations, the dosing module 112 may instead be positioned downstream of a turbocharger or upstream of a turbocharger.

The sensor 150 may be coupled to the exhaust system 190 to detect a condition of the exhaust gas flowing through the exhaust system 190. In some implementations, the sensor 150 may have a portion disposed within the exhaust system 190, such as a tip of the sensor 150 extending into a portion of the exhaust system 190. In other implementations, the sensor 150 may receive exhaust gas through another conduit, such as a sample pipe extending from the exhaust system 190. While the sensor 150 is depicted as positioned downstream of the SCR catalyst 106, it should be understood that the sensor 150 may be positioned at any other position of the exhaust system 190, including upstream of the DPF 102, within the DPF 102, between the DPF 102 and the decomposition chamber 104, within the decomposition chamber 104, between the decomposition chamber 104 and the SCR catalyst 106, within the SCR catalyst 106, or downstream of the SCR catalyst 106. In addition, two or more sensor 150 may be utilized for detecting a condition of the exhaust gas, such as two, three, four, five, or six sensors 150 with each sensor 150 located at one of the foregoing positions of the exhaust system 190.

DEF Deposit Reduction

When injecting DEF from reductant sources 116 to the decomposition chamber 104 via the dosing module 112 and pump 118, the spray penetrates the decomposition chamber 104 and can impinge on the interior walls of the decomposition chamber 104, causing slow decomposition and deposit formation. A polished surface promotes DEF shedding off surfaces. In one implementation, polishing of the surfaces of the decomposition chamber may be accomplished using interior surface finishing techniques. In one implementation, the polished surface is a surface of a splash plate 195. The splash plate 195 is positioned within the decomposition chamber 104 so as to be directly impinged by DEF injected into the decomposition chamber 104. The splash plate 195 has a leading edge and a trailing edge. The leading edge is positioned upstream of the trailing edge with respect to an intended flow direction of exhaust gas through the decomposition chamber 104. For example, in the system 100 of FIG. 1, the intended flow direction of exhaust gas is from left to right. In some embodiments, the splash plate 195 is positioned such that the DEF injected into the decomposition chamber 104 impinges the surface of the splash plate 195 downstream of the leading edge.

Figure 2B:
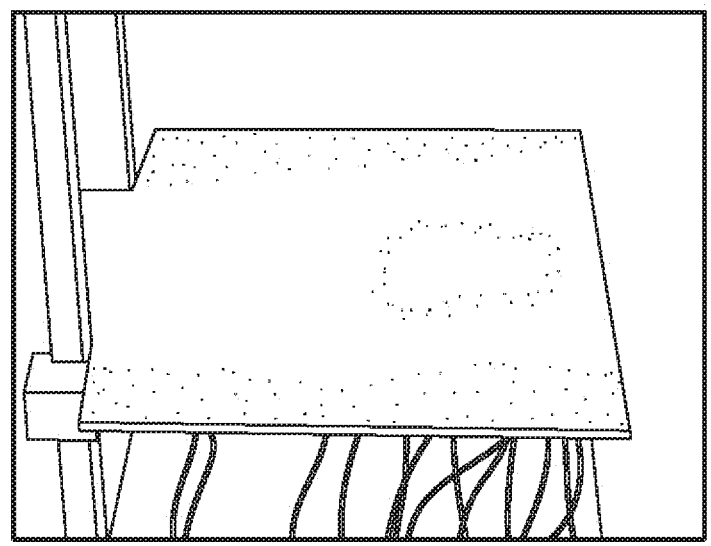

When DEF dosing is required, often times the injected DEF will strike internal walls or geometry of the decomposition chamber and form a thin film layer of DEF. Deposited DEF often decomposes, thereby risking the formation of urea byproducts known as deposits. A polished surface with minimal rough or jutting edges (e.g., a deburred surface) promotes DEF shedding off surfaces, DEF redistribution, and DEF deposition and crystallization prevention. FIGS. 2A and 2B depict visual distinctions between a standard unpolished plate and a polished plate using an implementation of the present disclosure. Moreover, DEF films having higher thicknesses also promote shedding from shear stress or gravity. In one implementation, extrude honing was utilized as a cost-effective method for finishing surfaces.

As used herein, the term "polished surface" refers to a surface having a surface roughness of no greater than 0.51 micrometers (20 microinches), and the term "unpolished surface" refers to a surface having a surface roughness of greater than 1.78 micrometers (70 microinches). It should be understood that any reference herein to surface roughness is intended to refer to an arithmetic mean of absolute values of profile height deviations from a mean line, which is commonly notated as "Ra."

In one embodiment, polishing was performed using a sanding device (e.g., a 320 grit silicon carbide sanding wheel). As a result of this polishing, DEF film pooling was observed on the polished plate rather than DEF film spreading. Thus, the polishing promoted wall-film quenching. When compared to unpolished surfaces, which promote DEF film spreading, polished surfaces qualitatively have less DEF crystallization. DEF crystallization was observed on edges of wall-film for unpolished surfaces. Polishing also does not have a significant impact on surface temperature drop during DEF dosing (a parameter linked with DEF deposition).

It has been determined that internal geometries of the decomposition chamber must be optimized according to their interactions with DEF. For example, impingement surfaces (e.g., splash plates) usually have separate purposes. Direct impingement surfaces are not intended to decompose DEF but merely redistribute the DEF and change the DEF flow velocity to align with flow direction. Thus, in one implementation, polished plates with high shear are preferable for re-entrainment from directly impinged surfaces. In one implementation, high shear stress may be based on shear flow levels greater than 1.08 $N/m^2$, where fluid flow calculations are conducted for an exhaust gas pipes with exhaust gas temperatures of approximately 500° C., exhaust gas velocities of about 30 m/s, and a 5 inch pipe. Reduction of temperature at the direct impingement surface prevents water evaporation on the surface, thereby reducing risk of deposition of DEF. Moreover, high thickness DEF films promote shear force from exhaust gas and re-entrainment. In one implementation, DEF is directly sprayed onto the impingement surface, without deposition on a leading edge of the impingement surface.

Downstream impingement surfaces (surfaces positioned downstream of DEF injection and not subjected to direct impingement of DEF) are not intended to shear DEF from the surface, but rather, for controlled decomposition of DEF. Thus, in one implementation, unpolished or rough surfaces having high heat transfer and water evaporation characteristics are preferable for downstream impingement surfaces. Unpolished or rough surfaces promote heat transfer. In one implementation, the downstream impingement surfaces have a reduced shear surface relative to the surface with high shear flow. In one implementation, the downstream impingement surfaces are high heat transfer rough surfaces having reduced shear surfaces relative to the surfaces with high shear flow.

Figure 3:
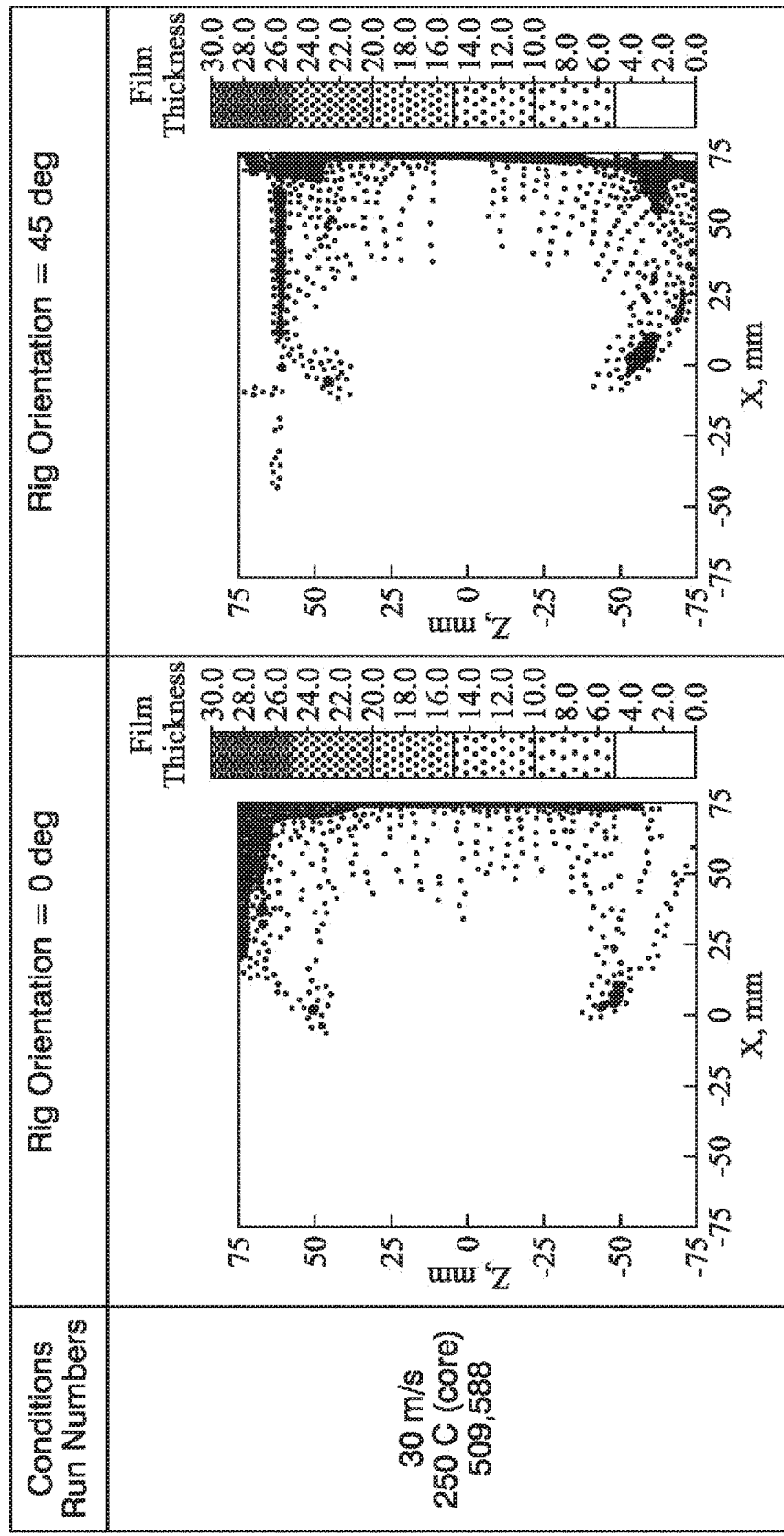
FIG. 3 illustrates film thickness contour plots at 59.5 sec and a 0-30 μm intensity scale.
Figure 3:
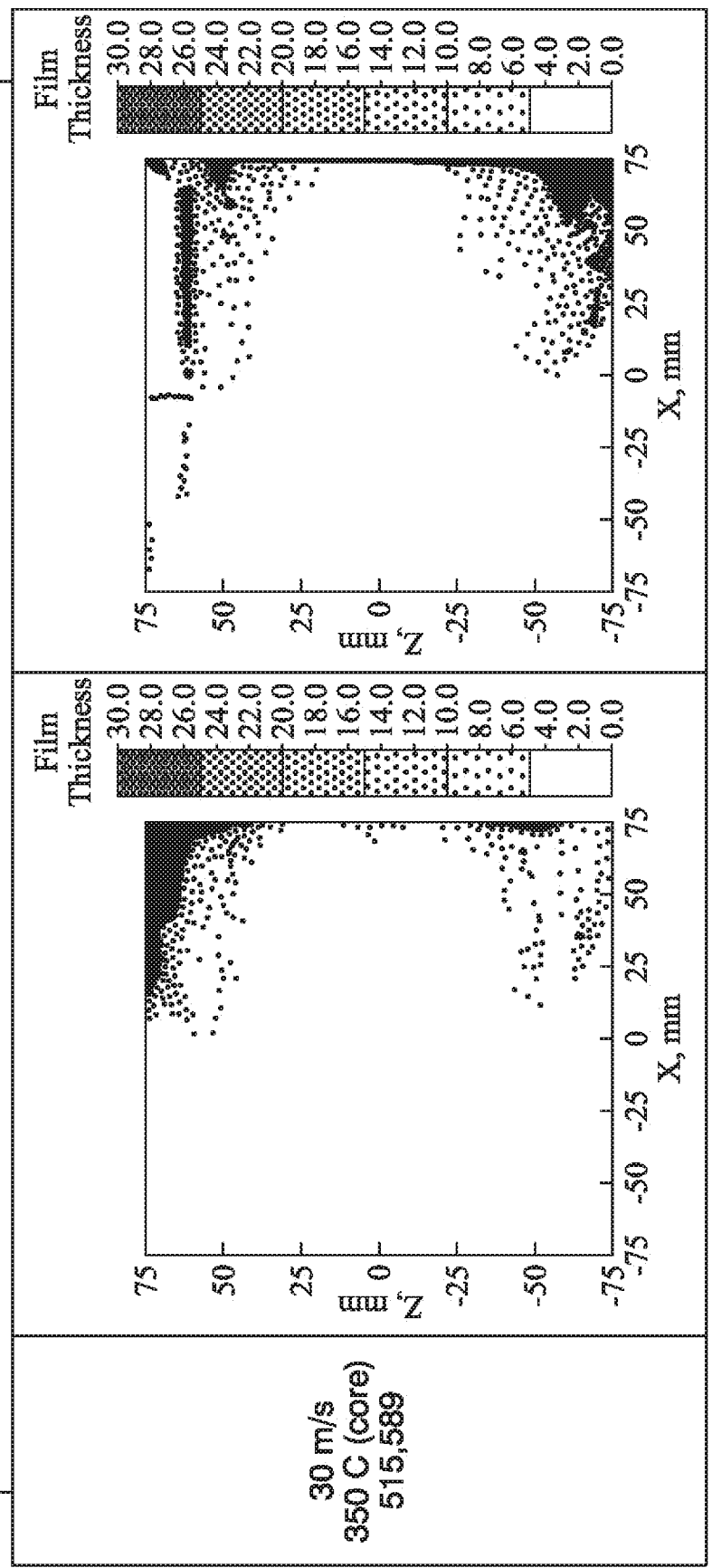

It was also determined that the trailing edge geometry of a surface (either direct or downstream) is critical to deposit formation. FIG. 3 illustrates film thickness contour plots at 59.5 sec and a 0-30 μm intensity scale as a function of surface angle orientation with respect to flow and temperature. Results show that at a DEF flow of 0.5 mL/s and an exhaust gas velocity of 30 m/s, the greatest deposition on a top surface of the geometry in the flow path was approximately 75 mm (+75 mm), regardless of temperature (e.g., either 250° C. or 350° C.) and at a surface angle orientation of 0° (FIG. 3, top-left and bottom-left). The exhaust gas flow is perpendicular to the DEF injection and parallel to the splash plates. Moreover, the greatest deposition on a bottom surface of the geometry in the flow path was also approximately 75 mm (−75 mm, at a surface angle orientation of 45°), with more overall deposition occurring at 350° (FIG. 3, bottom-right) than at 250° (FIG. 3, top-right).

Though other methods may be contemplated, in one implementation, extrude honing processing (e.g., abrasive flow machining or abrasive flow deburring) is used for polishing, deburring, and forming radii on sharp edges of internal impinging surfaces or geometry of the decomposition chamber (e.g., on the trailing edge). Deburring and generating radii on the trailing edge of an impingement surface are likely beneficial for deposit prevention. Material removal rates are based on the degree of fluid abrasiveness, fluid speed, and fluid pressure. In the extrude honing process, the area of greatest restriction to a fluid's flow path is likely to have the highest fluid pressure and speed, thereby causing the area to be where the most material is removed, though other locations will also experience material removal.

Figure 4:
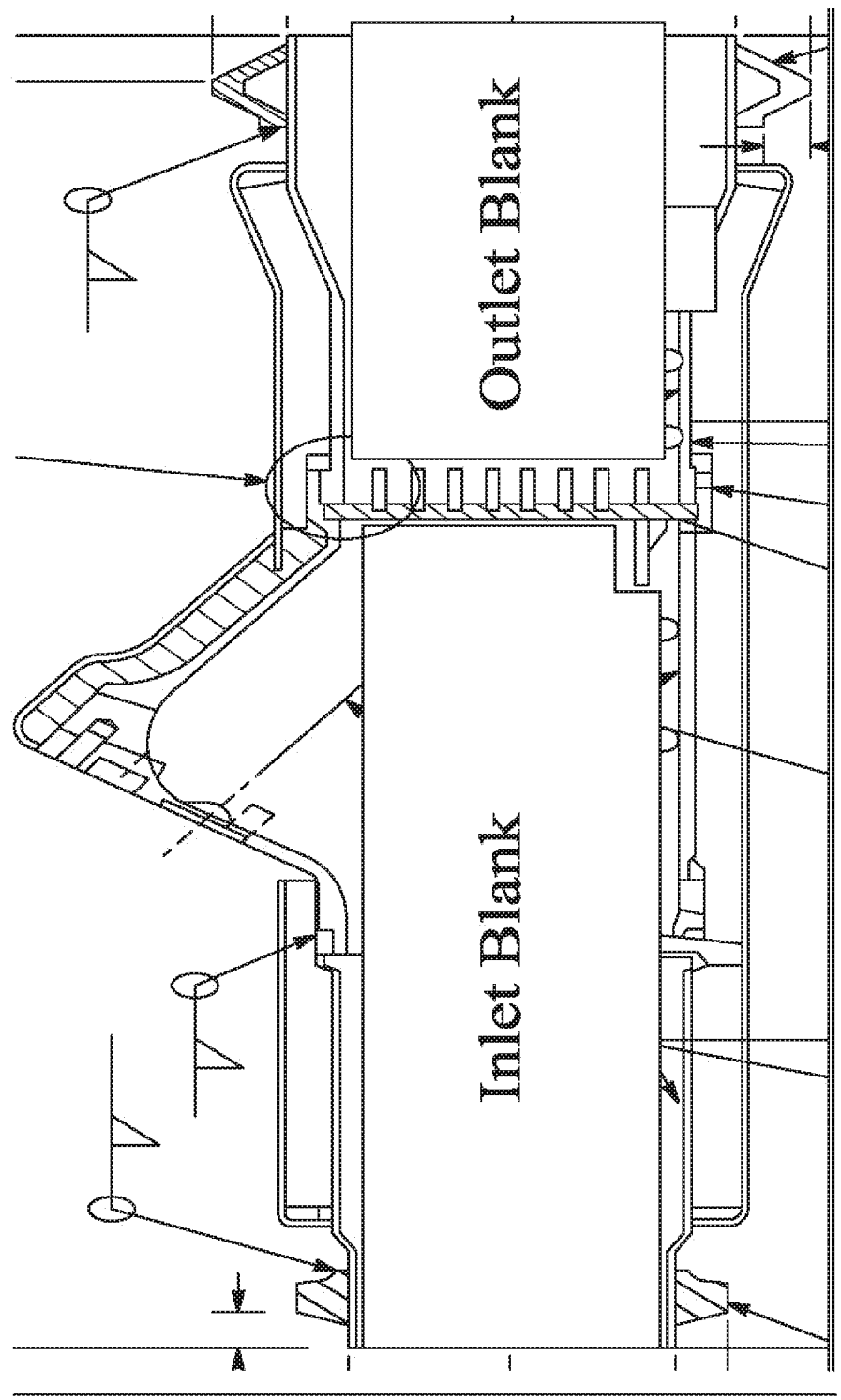
FIG. 4 illustrates an extrude honing material flow path between installed blanks and pipe walls.

Extrude honing processing is preferred because of its versatility in deburring, generating radii, sizing, polishing, and removing detrimental surface layers from stainless steel and other metal parts. Additionally, the extrude honing may be conducted on the entire decomposition chamber or key components thereof, such as mixers or splash plates. Internal area blanks may be used to reduce material consumption as well as focusing the abrasive media to key areas. For example, a blank may be designed to increase the restriction in the areas around the impingement surface, thereby increasing the material removal rate. FIG. 4 illustrates one example of the extrude honing material flow path between the installed blanks and pipe walls. The process is extremely cost effective because it greatly reduces direct labor costs by using unskilled labor and reducing total process time. Elimination of hand finishing operations assures a uniform controllable finish for higher quality finished products.

Alternative methods often utilize higher energy capacities. For example, engine regenerations typically dose fuel into the exhaust pipe, causing an exotherm across a DOC and higher energy consumption. Currently, there is no diesel exhaust fluid delivery device that eliminates deposit formation and no related methods to identify a process for improving performance of simple stainless steel geometry designs.

Thus, in the present disclosure novel interior surface finishing strategies are identified for decomposition chambers of aftertreatment systems in internal combustion engines. Additionally, in one implementation, extrude honing is used to accomplish all the desired finishing requirements (deburring, polishing, and forming radii on rough edges) in the same process. The technical solution described in this disclosure reduces the dependency on the engine's heat generation to prevent DEF deposit formation in engines (including both high horsepower engines and other engines) and eliminates the need for aftertreatment regenerations based on DEF deposit formation. As a result, aftertreatment systems utilizing the novel interior surface finishing strategies of the present disclosure would achieve decreased fuel wastage during aftertreatment regeneration and decreasing the packaging size.

While this specification contains many specific implementation details, these should not be construed as limitations on the scope of what may be claimed, but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, the separation of various system components in the implementations described above should not be understood as requiring such separation in all implementations, and it should be understood that the described components and systems can generally be integrated in a single product or packaged into multiple products embodied on tangible media.

As utilized herein, the terms "approximately," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims. Additionally, it is noted that limitations in the claims should not be interpreted as constituting "means plus function" limitations under the United States patent laws in the event that the term "means" is not used therein.

The terms "coupled" and the like as used herein mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another or with the two components or the two components and any additional intermediate components being attached to one another.

The terms "fluidly coupled," "in fluid communication," and the like as used herein mean the two components or objects have a pathway formed between the two components or objects in which a fluid, such as water, air, gaseous reductant, gaseous ammonia, etc., may flow, either with or without intervening components or objects. Examples of fluid couplings or configurations for enabling fluid communication may include piping, channels, or any other suitable components for enabling the flow of a fluid from one component or object to another.

It is important to note that the construction and arrangement of the system shown in the various exemplary implementations is illustrative only and not restrictive in character. All changes and modifications that come within the spirit and/or scope of the described implementations are desired to be protected. It should be understood that some features may not be necessary and implementations lacking the various features may be contemplated as within the scope of the application, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. An aftertreatment component comprising:
an aftertreatment housing comprising a first surface positioned so as to be directly impinged by diesel exhaust fluid injected into the aftertreatment housing, the first surface being a polished surface, wherein the first surface has a surface roughness of no greater than 0.51 micrometers.

2. The aftertreatment component of claim 1, wherein the aftertreatment component is a decomposition chamber, and wherein a splash plate positioned in the decomposition chamber comprises the first surface.

3. The aftertreatment component of claim 2, wherein the decomposition chamber comprises an internal area blank to increase restriction of an extrude honing material flow proximate the first surface.

4. The aftertreatment component of claim 2,
wherein the splash plate comprises a leading edge and a trailing edge, the leading edge positioned upstream of the trailing edge with respect to an intended flow direction of exhaust gas through the aftertreatment component, and
wherein the splash plate is positioned such that the diesel exhaust fluid injected into the aftertreatment housing impinges the first surface downstream of the leading edge.

5. The aftertreatment component of claim 2, wherein the splash plate comprises a stainless steel plate polished via extrude honing.

6. The aftertreatment component of claim 1, wherein the aftertreatment housing further comprises a second surface positioned downstream of the first surface and positioned so as to be indirectly impinged by the diesel exhaust fluid injected into the aftertreatment housing, a surface roughness of the second surface being greater than the surface roughness of the first surface.

7. The aftertreatment component of claim 6, wherein the second surface has a surface roughness of at least 1.78 micrometers.

8. The aftertreatment component of claim 6, wherein the aftertreatment component is a decomposition chamber, and wherein an interior surface of the decomposition chamber comprises the second surface.

9. The aftertreatment component of claim 8, wherein the interior surface of the decomposition chamber comprises cold rolled stainless steel.

10. The aftertreatment component of claim 8, wherein the interior surface of the decomposition chamber comprises cast stainless steel.

11. A method for processing an aftertreatment component including a splash plate and a housing, the method comprising:
polishing a first surface of the splash plate using an extrude honing process; and
positioning the splash plate in the housing such that the first surface of the splash plate is to be directly impinged by diesel exhaust fluid injected into the housing; wherein, in response to the polishing of the first surface, the first surface has a surface roughness of no greater than 0.51 micrometers.

12. The method of claim 11,
wherein the positioning of the splash plate in the housing is performed prior to the polishing of the first surface of the splash plate,
the method further comprising, in response to the positioning of the splash plate in the housing, positioning an internal area blank within the housing so as to increase restriction of an extrude honing material flow proximate the first surface,
wherein the polishing of the first surface comprises flowing the extrude honing material through the housing.

13. The method of claim 11, wherein the polishing of the first surface of the splash plate is performed prior to the positioning of the splash plate in the housing.

14. The method of claim 11,
wherein the splash plate comprises a leading edge and a trailing edge, the leading edge positioned upstream of the trailing edge with respect to an intended flow direction of exhaust gas through the housing, and
wherein the positioning of the splash plate within the housing further comprises positioning the splash plate such that the diesel exhaust fluid injected into the housing impinges the first surface downstream of the leading edge.

15. The method of claim 11, wherein the housing further comprises a second surface positioned downstream of the first surface and positioned so as to be indirectly impinged by the diesel exhaust fluid injected into the housing, the second surface being a rough surface.

16. The method of claim 15, wherein the second surface has a greater surface roughness than the first surface.

17. An aftertreatment housing, comprising:
a first surface positioned so as to be directly impinged by diesel exhaust fluid injected into the aftertreatment housing, the first surface being a polished surface, and
a second surface positioned so as to be indirectly impinged by the diesel exhaust fluid injected into the aftertreatment housing, the second surface having a surface roughness of at least 1.78 micrometers.

18. The aftertreatment housing of claim 17, wherein the first surface has a surface roughness of no greater than 0.51 micrometers.

19. The aftertreatment housing of claim 17, wherein:
the aftertreatment housing is a decomposition chamber, and wherein a splash plate positioned in the decomposition chamber comprises the first surface;
the splash plate comprises a leading edge and a trailing edge, the leading edge positioned upstream of the trailing edge with respect to an intended flow direction of exhaust gas through the aftertreatment housing; and
the splash plate is positioned such that the diesel exhaust fluid injected into the aftertreatment housing impinges the first surface downstream of the leading edge.

20. The aftertreatment housing of claim 17, wherein the surface roughness of the second surface is greater than the surface roughness of the first surface.

* * * * *